United States Patent
Zheng et al.

(10) Patent No.: US 11,168,163 B2
(45) Date of Patent: Nov. 9, 2021

(54) ETHYLENE-(METH)ACRYLIC ACID COPOLYMER AND WATER-DISPERSIVE COMPOSITION INCLUDING THE SAME

(71) Applicants: SK Innovation Co., Ltd., Seoul (KR); SK Global Chemical Co., Ltd., Seoul (KR); SK GC Americas Inc., Houston, TX (US)

(72) Inventors: Yong Zheng, Houston, TX (US); Doh Yeon Park, Daejeon (KR); Mark Jasek, Freeport, TX (US); Suk Joon Kim, Daejeon (KR); Hai Jin Shin, Daejeon (KR); Ju Eun Jung, Daejeon (KR); Byoung Cheon Jo, Daejeon (KR); Christopher Balhoff, Freeport, TX (US); Du Youn Ka, Daejeon (KR)

(73) Assignees: SK Innovation Co., Ltd., Seoul (KR); SK Global Chemical Co., Ltd., Seoul (KR); SKGC Americas Inc., Houston, TX (US)

( * ) Notice: Subject to any disclaimer, the term of this patent is extended or adjusted under 35 U.S.C. 154(b) by 124 days.

(21) Appl. No.: 16/257,818

(22) Filed: Jan. 25, 2019

(65) Prior Publication Data
US 2020/0239611 A1 Jul. 30, 2020

(51) Int. Cl.
C08F 220/06 (2006.01)
C08F 210/02 (2006.01)
C08L 23/08 (2006.01)

(52) U.S. Cl.
CPC .......... *C08F 220/06* (2013.01); *C08F 210/02* (2013.01); *C08L 23/0869* (2013.01); *C08F 2500/04* (2013.01); *C08F 2500/12* (2013.01); *C08L 2201/54* (2013.01); *C08L 2203/162* (2013.01)

(58) Field of Classification Search
CPC .......................... C08F 220/06; C08F 210/02
See application file for complete search history.

(56) References Cited

U.S. PATENT DOCUMENTS

| | | | |
|---|---|---|---|
| 6,852,792 B1 | 2/2005 | Capendale et al. | |
| 8,232,336 B2 | 7/2012 | Moncla et al. | |
| 2013/0184419 A1* | 7/2013 | Berbee | C08F 210/02 526/64 |
| 2018/0265712 A1 | 9/2018 | van Sluijs et al. | |

FOREIGN PATENT DOCUMENTS

| | | | |
|---|---|---|---|
| JP | 2003336191 A | * | 11/2003 |
| KR | 100767561 B1 | | 10/2007 |
| KR | 20180057661 A | | 5/2018 |
| WO | 2005085331 A1 | | 9/2005 |
| WO | 2017050589 A1 | | 3/2017 |

OTHER PUBLICATIONS

Machine translation of JP-2003336191-A. (Year: 2003).*
Dow Technical information, PRIMACOR 5990I copolymer. (Year: 2008).*
Iwase, "Complete Esterification of Ethylene-Methacrylic Acid and Ethylene-Acrylic Acid Copolymers by Reaction of Their Salts with Ethyl Iodide", Journal of Polymer Science Part A: Polymer Chemistry, 1991, vol. 29, pp. 585-589.
"Dow Primacor® 5990I Ethylene Acrylic Acid (EAA)", Songhan Plastic Technology Co., Ltd., 2015, 1 page, retrieved from http://www.lookpolymers.com/pdf/Dow-Primacor-5990I-Ethylene-Acrylic-Acid-EAA.pdf.

* cited by examiner

*Primary Examiner* — Wenwen Cai
(74) *Attorney, Agent, or Firm* — The Webb Law Firm

(57) ABSTRACT

An ethylene-(meth)acrylic acid copolymer has a polydispersity index (PDI) in a range from 3.5 to 8.0, and has a melt flow index (MFI) measured at 190° C. and 2.16 kg in a range from 350 g/10 min to 1800 g/10 min A water-dispersive composition includes the ethylene (meth)acrylic acid copolymer, a neutralizing agent and an aqueous medium.

14 Claims, 1 Drawing Sheet

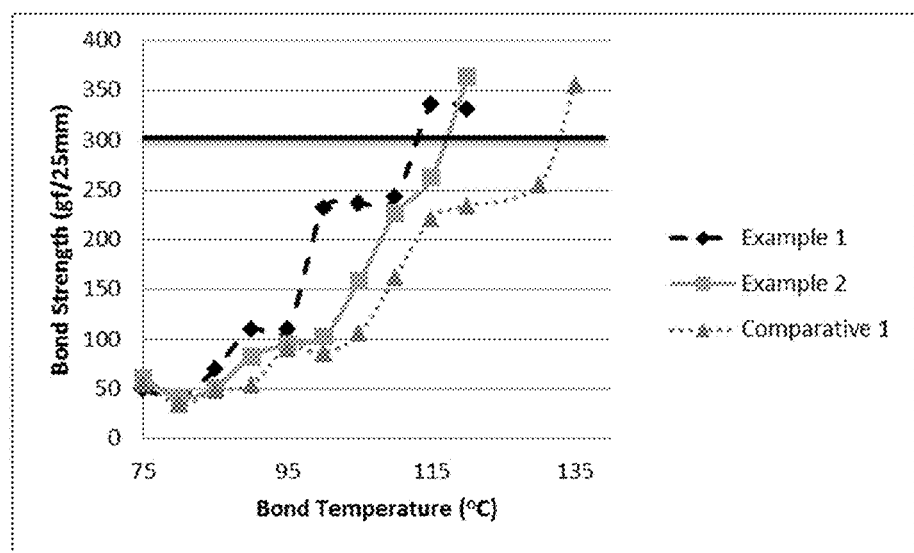

ETHYLENE-(METH)ACRYLIC ACID COPOLYMER AND WATER-DISPERSIVE COMPOSITION INCLUDING THE SAME

BACKGROUND OF THE INVENTION

Field of the Invention

The present invention relates to an ethylene-(meth)acrylic acid copolymer and water-dispersive composition including the same.

Description of Related Art

An ethylene-acrylic acid copolymer may be prepared as, e.g., a water-dispersive liquid to be used in a formation of a coating layer or a bonding layer. For example, the water-dispersive composition may be coated on a surface of a polymer film, paper, a metal foil, a fabric product, and then heated to form a welding layer or a bonding layer.

A dispersive solution including the ethylene-acrylic acid copolymer may be also used to implement a sealing of a vinyl bag or a metal foil bag. In this case, the dispersive solution may be partially coated on an object, and then a pressing process may be performed together with heating.

If a heating temperature during the sealing process is excessively increased in order to initate a seal, the object may be damaged. Further, if a viscosity of the dispersive solution is excessively high, wettability of the solution may be degraded and a uniform sealing layer may not be obtained.

Additionally, if non-dispersible contents generated from the ethylene-acrylic acid copolymer increase in the dispersive solution, an adhesive force or a bonding strength may be reduced, and an amount of the dispersive solution required in a formation of the sealing layer may be increased.

Thus, proper properties of the ethylene-acrylic acid copolymer to implement a reliable sealing process at low temperatures are required from the aspects as discussed above.

For example, International Patent Publications WO2005/085331 and WO2017/050589 disclose a formation of a heat-sealing coating layer using an aqueous polymer dispersive solution.

SUMMARY OF THE INVENTION

According to an aspect of the present invention, there is provided an ethylene-(meth)acrylic acid copolymer having improved heat-adhesive property and process reliability, and a method of producing the same.

According to an aspect of the present invention, there is provided a water-dispersive composition including an ethylene-(meth)acrylic acid copolymer which has improved heat-adhesive property and process reliability.

According to exemplary embodiments, an ethylene-(meth)acrylic acid copolymer has a polydispersity index (PDI) in a range from 3.5 to 8.0, and has a melt flow index (MFI) measured at 190° C. and 2.16 kg in a range from 350 g/10 min to 1800 g/10 min.

In some embodiments, a content of (meth)acrylic acid may be 15 to 30 wt %, and a content of ethylene may be 70 to 85 wt % in the ethylene-(meth)acrylic acid copolymer.

In some embodiments, a melting point of the ethylene-(meth)acrylic acid copolymer may be in a range from 50° C. to 95° C.

In some embodiments, a weight average molecular weight (Mw) of the ethylene (meth)acrylic acid copolymer may be in a range from 10,000 to 60,000.

In some embodiments, a ratio of a z-average molecular weight (Mz) measured by a gel permeation chromatography (GPC) relative to a weight average molecular weight (Mw) measured by a GPC may be in a range from 2.5 to 5.

In some embodiments, a ratio of a z-average molecular weight (Mz) measured by a gel permeation chromatography (GPC)-light scattering (LS) detector relative to a weight average molecular weight (Mw) measured by a GPC-LS detector may be is in a range from 4 to 12.

In some embodiments, the PDI of the copolymer may be 3.8 to 6.0, and the MFI of the copolymer may be in a range from 1,000 g/10 min to 1,500 g/10 min.

According to exemplary embodiments, a water-dispersive composition includes an ethylene-(meth)acrylic acid copolymer having a polydispersity index (PDI) in a range from 3.5 to 8.0, and having a melt flow index (MFI) measured at 190° C. and 2.16 kg in a range from 350 g/10 min to 1800 g/10 min, a neutralizing agent, and an aqueous medium.

In some embodiments, a solid content of the composition may be in a range from 20% to 50%.

In some embodiments, a solid content of the composition may be in a range from 30% to 40%.

In some embodiments, a viscosity of the composition at 25° C. may be in a range from 100 cps to 10,000 cps.

In some embodiments, a viscosity of the composition at 25° C. may be in a range from 100 cps to 2,500 cps.

In some embodiments, a degree of neutralization of acid groups included in ethylene-(meth)acrylic acid copolymer may be in a range from 25% to 50%.

In some embodiments, the neutralizing agent may include at least one of $NH_4OH$, an organic amine, KOH, NaOH, CsOH or LiOH.

In some embodiments, the composition may further include at least one a polyolefin-based polymer.

According to exemplary embodiments as described above, the ethylene-(meth)acrylic acid copolymer may have relatively broad molecular weight distribution and high MFI. Accordingly, the ethylene-(meth)acrylic acid copolymer may have low melting point and sealing initiation temperature (SIT).

Thus, a bonding layer or a sealing layer may be easily formed at low temperature and thermal damages of an object may be prevented.

Further, viscosity increase and generation of non-dispersible components may be suppressed to facilitate a thermal process so that bonding reliability and uniformity may be improved.

BRIEF DESCRIPTION OF THE DRAWING

FIG. 1 is a graph showing a thermal bonding strength change depending on temperature in water-dispersive compositions of Examples 1 and 2, and Comparative Example 1.

DESCRIPTION OF THE INVENTION

<Ethylene-(Meth)Acrylic Acid Copolymer>

An ethylene-(meth)acrylic acid (EAA) copolymer according to exemplary embodiments may be prepared by a copolymerization using ethylene and (meth)acrylic acid as monomers. The term "(meth)acrylic acid" is used to indicate both acrylic acid and methacrylic acid, or derivatives (e.g., (meth)acrylate) thereof.

In exemplary embodiments, the ethylene-(meth)acrylic acid copolymer may have relatively broad molecular distribution and high melt flow index (MFI) value.

In exemplary embodiments, a polydispersity index (PDI) calculated by the absolute molecular weight measurement of the ethylene-(meth)acrylic acid copolymer may be in a range from 3.5 to 8.0.

If the PDI of the ethylene-(meth)acrylic acid copolymer is less than 3.5, a sealing initiation temperature may not be sufficiently lowered while suppressing a viscosity increase. If the PDI of the ethylene-(meth)acrylic acid copolymer exceeds 8.0, a uniformity of a molecular weight distribution may be excessively degraded to cause a large amount of non-dispersible components.

In a preferable embodiment, the PDI of the ethylene-(meth)acrylic acid copolymer may be in a range from 3.8 to 6.0.

In exemplary embodiments, a melt flow index (MFI) of the ethylene-(meth)acrylic acid copolymer may be in a range from 350 g/10 min to 1800 g/10 min at 190° C. and 2.16 kg.

The melt flow index may indicate a flowability of a polymer at high temperature. In exemplary embodiments, the MFI of the ethylene-(meth)acrylic acid copolymer may be controlled to be 350 g/10 min or more so that a fast coating or welding property may be achieved even at a low temperature in a sealing process. Further, a uniform coating layer may be formed due to an increase of melting property or flowability, and a stable thermal bonding may be implemented.

If the MFI of the ethylene-(meth)acrylic acid copolymer becomes excessively high, heat resistance or a mechanical strength of a sealing layer or a bonding layer may be reduced. Thus, according to exemplary embodiments, the MFI of the ethylene-(meth)acrylic acid copolymer may be controlled to be 1800 g/10 min or less. If the MFI of the ethylene-(meth)acrylic acid copolymer exceeds 1800 g/10 min, a flowability may become excessively high and the copolymer may not be easily prepared as a product such as a pellet.

In a preferable embodiment, the MFI of the ethylene-(meth)acrylic acid copolymer may be in a range from 1000 g/10 min to 1500 g/10 min.

In exemplary embodiments, an amount of (meth)acrylic acid (e.g., units or blocks derived from an (meth)acrylic acid) based on a total weight of the ethylene-(meth)acrylic acid copolymer may be in a range from 15 weight percent (wt %) to 30 wt %. In this case, an amount of ethylene (e.g., units or blocks derived from ethylene) may be in a range from 70 wt % to 85 wt %. In a preferable embodiment, the amount of (meth)acrylic acid may be in a range from 17 wt % to 28 wt % and the amount of ethylene may be in a range from 72 wt % to 83 wt %. More preferably, the amount of (meth)acrylic acid may be in a range from 19 wt % to 26 wt % and the amount of ethylene may be in a range from 74 wt % to 81 wt %

If the amount of (meth)acrylic acid is relatively low, the water dispersibility of the material may be compromised. If the amount of (meth)acrylic acid becomes higher, production efficiency may be deteriorated due to, e.g., a generation of polyacrylic acid and excessive corrosion to the manufacture equipment. Thus, the amount of (meth)acrylic acid may be controlled within the range as described above so that the bonding strength of the coating layer or the sealing layer including the ethylene-(meth)acrylic acid copolymer may be enhanced.

In exemplary embodiments, a melting point (Tm) of the ethylene-(meth)acrylic acid copolymer may be in a range from 50° C. to 95° C. Accordingly, a thermal bonding or welding process may be easily performed at a low temperature less than 95° C.

Preferably, the melting point of the ethylene-(meth) acrylic acid copolymer may be in a range from 60° C. to 90° C., more preferably from 70° C. to 80° C.

In exemplary embodiments, a weight average molecular weight of the ethylene-(meth)acrylic acid copolymer may be in a range from 10,000 to 60,000 within the above-mentioned PDI range. In a preferable embodiment, the weight average molecular weight of the ethylene-(meth)acrylic acid copolymer may be in a range from 10,000 to 40,000, more preferably from 12,000 to 30,000.

In some embodiments, a ratio (Mz/Mw) of a z-average molecular weight relative (Mz) and the weight average molecular weight (Mw) which are measured by a relative method may be in a range from 2.5 to 5. For example, the ratio (Mz/Mw) of the z-average molecular weight relative (Mz) and the weight average molecular weight (Mw) which are measured by a gel permeation chromatography (GPC) may be in a range from 2.5 to 5.

Preferably, the ratio (Mz/Mw) of the z-average molecular weight relative (Mz) and the weight average molecular weight (Mw) which are measured by the gel permeation chromatography (GPC) may be in a range from 2.5 to 3.5.

In some embodiments, a ratio of a z-average molecular weight relative (Mz) measured by an absolute method relative to the weight average molecular weight (Mw) measured by the absolute method may be in a range from 4 to 12, preferably 6 to 10. For example, the absolute method may be performed using a gel permeation chromatography (GPC)-light scattering (LS) detector.

Within the above-mentioned rages relating a molecular weight distribution, the ethylene-(meth)acrylic acid copolymer may have a broader molecular weight distribution so that reduction of viscosity and sealing initiation temperature may be effectively realized.

According to exemplary embodiments of the present invention, a method of producing the ethylene-(meth)acrylic acid copolymer is provided. In exemplary embodiments, the ethylene-(meth)acrylic acid copolymer may be obtained by a continuous process using a continuous stirred tank reactor (CSTR).

For example, ethylene and (meth)acrylic acid may be injected into the CSTR together with an initiator. The initiator may include a free radical initiator such as an organic peroxide, an azo-based compound, or the like.

In some embodiments, a chain transfer agent (CTA) may be also injected into the reactor. The CTA may be used to terminate a polymer chain propagation and control a final molecular weight distribution. For example, a polymerization of a propagating chain may be terminated by the CTA and a polymerization of a new chain may be initiated. The MFI of the ethylene-(meth)acrylic acid copolymer may be easily controlled by the CTA.

The CTA may include, e.g., a hydrocarbon-based compound such as pentane, hexane, cyclohexane, isobutane, etc.; a ketone-based compound such as acetone, diethyl ketone, etc.; an alcohol-based compound such as methanol, ethanol, etc.

In some embodiments, the CTA may be utilized as a solvent transferring ethylene or (meth)acrylic acid. An amount of the CTA may be in a range from 2 volume (vol) % to 4 vol % based on a total volume of components injected in the reactor. Within this range, a sufficiently broad molecular weight distribution may be easily achieved while maintaining the MFI range.

In exemplary embodiments, a pressure in the reactor may be in a range from 20,000 psi to 30,000 psi. A temperature in the reactor may be in a range from 200° C. to 260° C. Within these ranges, the broad molecular weight distribution and high MFI as described above may be easily achieved.

A polymer obtained from the reactor may be processed into a product as, e.g., a pellet.

<Water-Dispersive Composition>

According to exemplary embodiments, a water-dispersive composition including the ethylene-(meth)acrylic acid copolymer is provided. The water-dispersive composition may include the ethylene-(meth)acrylic acid copolymer, a neutralizing agent and an aqueous dispersion medium.

As described above, the ethylene-(meth)acrylic acid copolymer may have a PDI ranging from 3.5 to 8, and an MFI ranging from 350 g/10 min to 1800 g/10 min at 190° C., and 2.16 kg. For example, an amount of the ethylene-(meth)acrylic acid copolymer may be in a range from 5 wt % to 60 wt % based on a total weight of the water-dispersive composition.

The neutralizing agent may be mixed with the ethylene-(meth)acrylic acid copolymer so that the water-dispersive composition may be prepared as a stable viscous fluid.

An alkaline compound may be used as the neutralizing agent. In a preferable embodiment, the neutralizing agent may include an organic-based alkaline compound such as ammonium hydroxide or an amine-based compound. Alternatively, the neutralizing agent may include an inorganic alkaline compound such as KOH, NaOH, CsOH, or the like. These may be used alone or in a combination thereof.

As a degree of neutralization of the ethylene-(meth)acrylic acid copolymer becomes greater, dispersibility of the water-dispersive composition may be increased, and an amount of non-dispersible components may be reduced. However, as the degree of neutralization of the ethylene-(meth)acrylic acid copolymer becomes greater, a viscosity of the water-dispersive composition may be increased to degrade coating and bonding properties.

However, according to exemplary embodiments, the ethylene-(meth)acrylic acid copolymer of this invention having the relatively large molecular weight distribution and melting flow index may be utilized. Thus, a sufficient degree of neutralization may be achieved while preventing excessive increase of the viscosity.

The term "degree of neutralization" used herein may indicate a ratio of acid groups (carboxylic groups) reacted or neutralized by the neutralizing agent among total acid groups included in the ethylene-(meth)acrylic acid copolymer.

In some embodiments, the degree of neutralization of the water-dispersive composition may be in a range from 25% to 50%. If the degree of neutralization is less than 25%, sufficient dispersibility and coating uniformity may not be obtained. If the degree of neutralization exceeds 50%, the viscosity of the composition may be excessively increased.

Preferably, the degree of neutralization of the water-dispersive composition may be in a range from 25% to 40%. Within this range, the viscosity increase may be suppressed, and the coating uniformity may be enhanced.

In exemplary embodiments, a viscosity of the water-dispersive composition measured at 25° C. may be in a range from 100 cps to 10,000 cps. Preferably, the viscosity of the water-dispersive composition measured at 25° C. may be in a range from 100 cps to 2500 cps.

As described above, the ethylene-(meth)acrylic acid copolymer having high dispersive and melt flow properties may be used so that the water-dispersive composition capable of forming the uniform bonding layer or sealing layer at low temperature may be obtained.

In exemplary embodiments, a sealing initiation temperature (SIT) of the water-dispersive composition may be 125° C. or less, preferably 120° C. or less. The SIT may indicate a minimum temperature at which a predetermined bond strength is maintained in a peeling test. In exemplary embodiments, the SIT may be a minimum temperature at which 300 gf/25 mm of the bond strength is maintained at a peeling test at 100 mm/min and 180°.

In some embodiments, the water-dispersive composition may include an additional polymer or resin without degrading features of the ethylene-(meth)acrylic acid copolymer including low temperature bonding, high dispersion and low viscosity properties.

For example, a polyolefin-based resin such as polyethylene, polypropylene, etc., may be added without deteriorating an acid value and a viscosity of the ethylene-(meth)acrylic acid copolymer.

In an embodiment, a solid content based on a total weight of the water-dispersive composition may be in a range from 20% to 50%, preferably from 30% to 40%. Within this range, volatile components may be easily removed at low temperature from the bonding layer or the sealing layer.

The water-dispersive composition may be used as a sealant of a packaging film including, e.g., polyethylene, polypropylene, polymethylmethacrylate, polyethylene terephthalate, aluminum foil etc. For example, the water-dispersive composition may be coated on a sealing surface of the packaging film, and then thermally pressed to form the sealing layer or the bonding layer easily.

As described above, the ethylene-(meth)acrylic acid copolymer or the water-dispersive composition may have the SIT of 120° C. or less so that the sealing process may be easily performed without film damages at high temperature.

The water-dispersive composition may be coated on various objects such as paper, a resin film, a metal foil, etc., to form an insulation structure such as an adhesive layer, an anti-static layer, an encapsulation layer, etc.

The water-dispersive composition may further include an additive without degrading, e.g., dispersive or thermal properties of the ethylene-(meth)acrylic acid copolymer. For example, the additive may include an anti-static agent, a surfactant, an inorganic particle, an anti-blocking agent or combination thereof.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

(1) Preparation of Ethylene-(Meth)Acrylic Acid Copolymer

Ethylene and acrylic acid (AA) as monomers, t-butyl peroctoate as an initiator, and isobutane as a chain transfer agent were continuously injected into a continuous stirred tank reactor (CSTR) with a constant input ratio to prepare an ethylene-acrylic acid copolymer. Specifically, a weight ratio of AA in the copolymer was controlled to be 20 wt %, and an initiator efficiency (i.e., an amount of the initiator for producing 1 kg of the copolymer) was 1 g. A volume ratio of the chain transfer agent based on a total volume of the components was 4.1 vol %.

A pressure of the reactor was 27,000 psi, and a temperature in the reactor was 240° C. An inlet gas temperature to the reactor was 75° C.

Copolymer product was separated and formulated as a pellet through an extruder.

(2) Measuring Properties of Ethylene-(Meth)Acrylic Acid Copolymer

1) Measuring molecular weights of copolymer (Mw, Mn, Mz, relative Mz/Mw, absolute Mz/Mw)

Before GPC measurements, the acid groups of the copolymer product were converted to the esters in order not to be absorbed on the surface of fillers packed in columns of GPC. The conversion was conducted according to a known method. (see YOSHIYUKI IWASE, J. POLYM. SCI. PART A: POLYM. CHEM.: VOL. 29, 585-589 (1991)). 2-5 mg of the sample was dissolved in an elution solution of 1M 1,2,4-Trichlorobenzene containing 200 ppm of butylated hydroxytoluene (BHT). The sample was prepared by stirring with a pre-treatment device (Agilent PL-SP 260 VS Sample Preparation System) at 150° C. for 4 hours.

200 μL of the dissolved sample was injected in a GPC system (temperature: 160° C., GPC flow rate: 1 mL/min) in which three columns (Model No.: PLgel Olexis 7.5×300 mm, 13 μm, manufactured by Agilent) and one guard column (Model No.: PLgel Olexis 7.5×50 mm, 13 μm, manufactured by Agilent) were connected.

Relative molecular weights Mn, Mw and Mz were measured using a GPC system connected to a refractive index detector (PL-GPC220, Agilent) and using a polystyrene standard.

Absolute molecular weights Mw(abs), Mn(abs) and Mz(abs) were measured by a multiple-detector GPC connected to a dual angle light scattering detector, (Model No.: PD2040).

Molecular weights data signals from Data Stream (Model No.: Agilent PL-DataStream) was treated using Agilent GPC/SEC Software™ (relative molecular weights) and Cirrus™ MultiDetector Software(absolute molecular weights).

2) Measuring Melt Flow Index (MFI)

An MFI was measured based on ASTM D1238 under a condition of 125° C. and 2.16 kg. An MFI under a condition of 190° C. and 2.16 kg was calculated using 20 times correlation with respect to the measuring value based on ASTM D1238 (125° C. and 2.16 kg).

3) Measuring Content of Acrylic Acid (AA %)

An acrylic acid content (AA %) in the EAA copolymer was measured using a Fourier Transform Infrared Spectroscopy. Deuterated triglycine sulfate was used as a detecting group and specific values were obtained from Resolution-Pro™ Software (Agilent).

Specifically, 120 mg sample of the EAA copolymer as the pellet shape was pressed in a hydraulic type hot press (130° C.) for 30 seconds to prepare a 50 μm sheet. A background spectrum was measured, and then the sheet was fixed in the middle of a film holder through which an IR beam passed. Measurements were performed by a transmissive mode and 32 scans of a repeating number.

3 standard samples, acrylic acid contents of which were known were also pre-treated as described above, and a first-order calibration equation of a C-O peak integral value with respect to the acrylic acid content was derived. A C-O peak integral value of the sample was substituted into the calibration equation to obtain an acrylic acid content (%).

4) Measuring Melting Point (Tm)

A melting point was measured using a differential scanning calorimeter (Q20 manufactured by TA).

Specifically, 10 mg sample of the EAA copolymer as the pellet shape was put in an aluminum crucible which was covered by a lid including pinholes.

Nitrogen as a purge gas was introduced by a flow rate of 50 mL/min. A temperature was increased at a rate of 10° C./min within a range of −50° C. to 180° C. (a first temperature increase period), and maintained at 180° C. for 1 minute. The sample was crystallized by cooling from 180° C. to −50° C. at a rate of 10° C./min. In a second temperature increase period, the temperature was changed from −50° C. to 180° C. at a rate of 10° C./min. A temperature of a melting peak at the second temperature increase period was measured.

(3) Preparation of Water-Dispersive Composition 151 g of water was filled in a 500 mL glass double jacket container. 102 g of the EAA copolymer was input, and 46.6 g of 10 wt % KOH as a neutralizing agent was input while stirring. The container was closed and heated to 90° C. while continuously stirring.

After 1 hour, the container was cooled to 60° C., and non-dispersible components were filtered and removed.

Example 2

A water-dispersive composition was prepared by the same process as that of Example 1 except that an amount of the chain transfer agent was 3.9 vol %.

Comparative Example 1

An EAA copolymer pellet product having molecular distribution properties and MFI as shown in Table 1 below was used, and a water-dispersive composition was prepared by the same process as that of Example 1.

Comparative Example 2

An EAA copolymer pellet product having molecular distribution properties as shown in Table 1 below was used, and a water-dispersive composition was prepared as follows. 190 g of water was filled in a 500 mL glass double jacket container. 75 of the EAA copolymer was input, and 35.7 g of 30 wt % KOH as a neutralizing agent was input while stirring. The container was closed and heated to 90° C. while continuously stirring.

After 1 hour, the container was cooled to 60° C., and non-dispersible components were filtered and removed.

Properties of the copolymers included in the water-dispersive composition of Examples and Comparative Examples are shown in Table 1 below.

TABLE 1

|  | Example 1 | Example 2 | Comparative Example 1 | Comparative Example 2 |
|---|---|---|---|---|
| Acid Content (AA %) | 20 | 20 | 20 | 20 |
| Mw (relative) | 12000 | 22000 | 18000 | 32000 |
| Mw (abs) | 32000 | 32000 | 24000 | 66000 |
| Mn (abs) | 7400 | 7700 | 7300 | 9500 |
| PDI (Mw/Mn) | 4.3 | 4.2 | 3.3 | 7.4 |
| Mz (abs) | 230000 | 150000 | 79000 | 670000 |
| Mz (abs)/Mw (abs) | 7.2 | 4.7 | 3.3 | 10.1 |

TABLE 1-continued

|  | Example 1 | Example 2 | Comparative Example 1 | Comparative Example 2 |
|---|---|---|---|---|
| Mz (relative) | 43000 | 77000 | 49000 | 103000 |
| Mz (relative)/ Mw (relative) | 2.6 | 3.5 | 2.7 | 3.3 |
| MFI | 1440 | 1156 | 1260 | 300 |
| Tm (° C.) | 72.8 | 73.6 | 74.1 | 76.9 |
| CTA amount, (vol %) | 4.1 | 3.9 | 1.3 | 3.2 |

Evaluation on Properties of Water-Dispersive Composition

1) Measuring Sealing Initiation Temperature (SIT)

The water-dispersive compositions of Examples and Comparative Examples were uniformly coated on an aluminum foil having a thickness of 110 μm using a wire-coating bar, and then dried for 10 minutes at 110° C. to form a coating layer having a thickness of 30 μm. The foil including the coating layer thereon was cut in a size of 2.5 cm (width) and 15 cm (length) to prepare a coating sample.

The prepared sample was put on a hot press device equipped with 5 heating blocks each of which had a size of 2.5 cm (width) and 1 cm (length). A non-coated aluminum foil having a size of 2.5 cm (width) and 15 cm (length) was put on the sample. The coated sample and the non-coated sample were adhered with a pressure of 0.2 MPa.

The SIT was measured using a universal test machine (UTM) as a minimum temperature at which 300 gf/25 mm of a bonding strength was obtained in a peeling test with a peeling angle 180° and a peeling rate of 100 mm/min 2) Measuring Viscosity Viscosities at 25° C. of the water-dispersive compositions of Examples and Comparative Examples after adding the neutralizing agent were measured using a viscometer (Brookfield DV-II, Spindle No. 52).

The results are shown in Table 2 below.

TABLE 2

|  | Example 1 | Example 2 | Comparative Example 1 | Comparative Example 2 |
|---|---|---|---|---|
| SIT (° C.) | 115 | 120 | 135 | Sealing (bonding) Failed |
| Viscosity (cps) | 702 | 2347 | 571 | 628 |
| Solid Contents (wt %) | 34 | 34 | 34 | 25 |
| Degree of Neutralization (%) | 28 | 28 | 28 | 90 |

Referring to Table 2, the SIT of the water-dispersive composition in Example 1 was about 20° C. less than that in Comparative Example 1. Specifically, referring to FIG. 1, bond temperatures at which 300 gf/25 mm of a bond strength was obtained were 120° C. or less in both Examples 1 and 2.

Additionally, even though a degree of neutralization of the water-dispersive composition in Example 1 had a remarkably lower than that in Comparative Example 2, the water-dispersive compositions in Example 1 and Comparative Example 2 had similar viscosities. The water-dispersive composition could not be formed from the copolymer of Comparative Example 2 with the same solid contents and degree of neutralization as those of Example 1. Further, when the solid content of the copolymer of Comparative Example 2 was increased to 30 wt % or more, gelation of the copolymer occurred in the dispersive composition and the viscosity could not be measured.

What is claimed is:

1. An ethylene-(meth)acrylic acid copolymer having a polydispersity index (PDI) calculated from an absolute method using a gel permeation chromatography(GPC)-light scattering(LS) detector in a range from 3.5 to 8.0, and having a melt flow index (MFI) measured at 190° C. and 2.16 kg in a range from 350 g/10 min to 1800 g/10 min;
   wherein a ratio of a z-average molecular weight (Mz) measured by a GPC-LS detector relative to a weight average molecular weight (Mw) measured by a GPC-LS detector is in a range from 6 to 10.

2. The ethylene-(meth)acrylic acid copolymer according to claim 1, wherein a content of (meth)acrylic acid is 15 to 30 wt %, and a content of ethylene is 70 to 85 wt %.

3. The ethylene-(meth)acrylic acid copolymer according to claim 1, wherein a melting point of the ethylene-(meth)acrylic acid copolymer is in a range from 50° C. to 95° C.

4. The ethylene-(meth)acrylic acid copolymer according to claim 1, wherein a the weight average molecular weight (Mw) measured by a gel permeation chromatography (GPC)-light scattering (LS) detector of the ethylene-(meth)acrylic acid copolymer is in a range from 10,000 to 60,000.

5. The ethylene-(meth)acrylic acid copolymer according to claim 1, wherein a ratio of a z-average molecular weight (Mz) measured by a relative method using a gel permeation chromatography (GPC) relative to a weight average molecular weight (Mw) measured by a relative method using a GPC is in a range from 2.5 to 5.0.

6. The ethylene-(meth)acrylic acid copolymer according to claim 1, wherein the PDI of the copolymer is 3.8 to 6.0, and the MFI of the copolymer is in a range from 1,000 g/10 min to 1,500 g/10 min.

7. A water-dispersive composition comprising:
   the ethylene-(meth)acrylic acid copolymer according to claim 1;
   a neutralizing agent; and
   an aqueous dispersion medium.

8. The water-dispersive composition according to claim 7, wherein a solid content of the composition is in a range from 20% to 50%.

9. The water-dispersive composition according to claim 7, wherein a solid content of the composition is in a range from 30% to 40%.

10. The water-dispersive composition according to claim 7, wherein a viscosity of the composition at 25° C. is in a range from 100 cps to 10,000 cps measured using a Brookfield DV-II viscometer, Spindle No. 52.

11. The water-dispersive composition according to claim 7, wherein a viscosity of the composition at 25° C. is in a range from 100 cps to 2,500 cps measured using a Brookfield DV-II viscometer, Spindle No. 52.

12. The water-dispersive composition according to claim 11, wherein a degree of neutralization of acid groups included in the ethylene-(meth)acrylic acid copolymer is in a range from 25% to 50%.

13. The water-dispersive composition according to claim 7, wherein the neutralizing agent includes at least one of $NH_4OH$, an organic amine, KOH, NaOH, CsOH, or LiOH.

14. The water-dispersive composition according to claim 7, further comprising at least one a polyolefin-based polymer.

\* \* \* \* \*